Jan. 12, 1954
R. F. ROTHSCHILD
2,666,199
RADIO DIRECTION MAINTAINING SYSTEM
Filed May 9, 1950
2 Sheets—Sheet 1
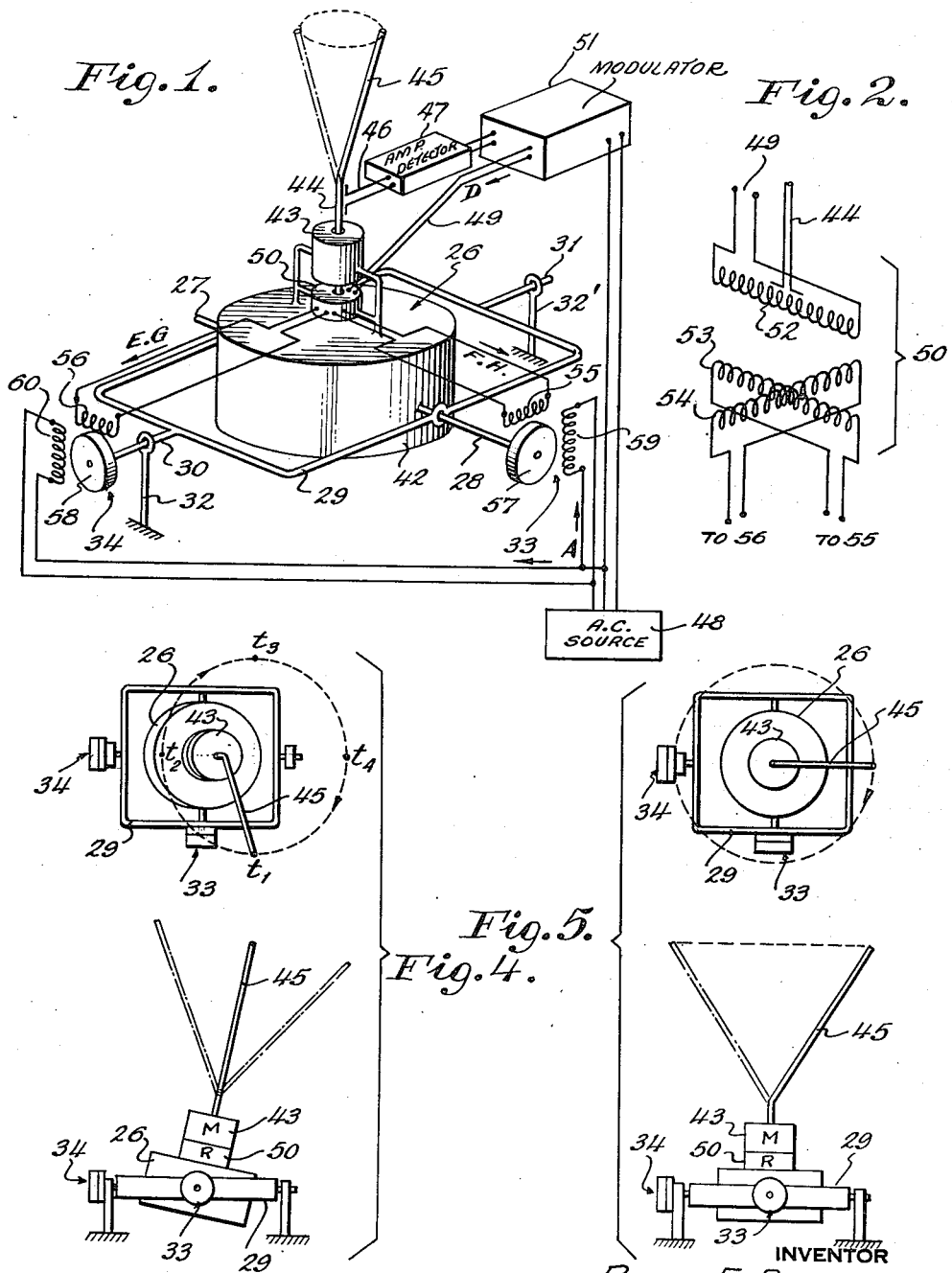
INVENTOR
ROBERT F. ROTHSCHILD
BY
Thomas M. Ferrill, Jr.
ATTORNEY

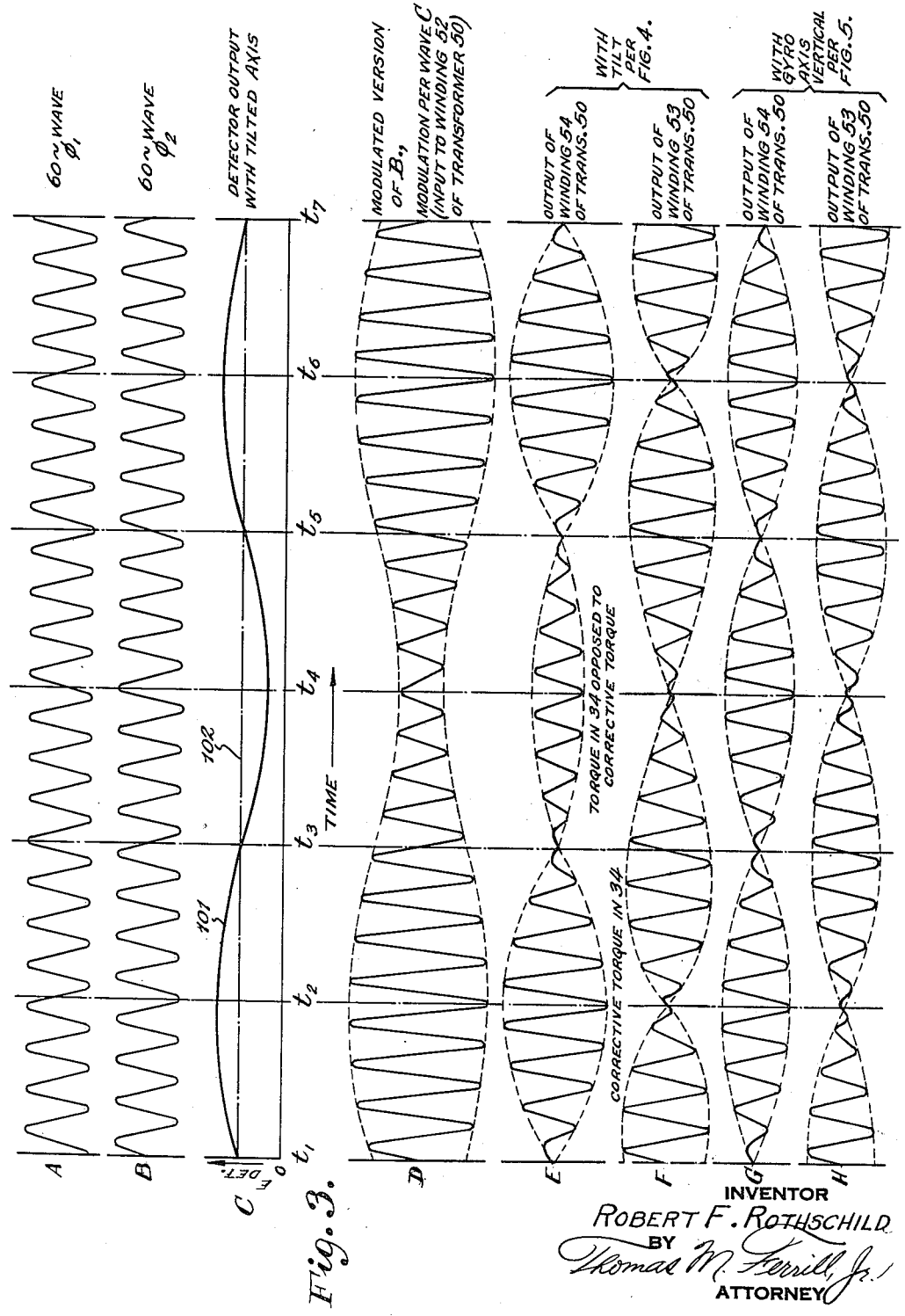

Patented Jan. 12, 1954

2,666,199

UNITED STATES PATENT OFFICE

2,666,199

RADIO DIRECTION MAINTAINING SYSTEM

Robert F. Rothschild, Bronx, N. Y., assignor to The Sperry Corporation, a corporation of Delaware Application May 9, 1950, Serial No. 160,921

11 Claims. (Cl. 343—117)

This invention relates to apparatus for determining and maintaining a vertical reference, and apparatus useful for this purpose and capable of maintaining a line of direction in space in relation to the characteristics of intercepted radio waves.

In certain types of navigation, it is necessary to establish and maintain a vertical reference. Universally supported pendulums have been used for this purpose, but are subject to the effects of lateral accelerations to such a great extent as to render them useful only in very limited applications. From these instruments were evolved damped gyro pendulums having longer periods of oscillation, but still subject to disturbance due to lateral accelerations. In modern navigation systems, it is common to make use of a gyro vertical comprising a gyroscope in a housing which is universally suspended about two mutually perpendicular normally horizontal axes, the gyro instrument itself being non-pendulous. To such an instrument is ordinarily attached a vertical reference element, which, in the past, has ordinarily been a gravitationally responsive element, usually in the form of a mechanically movable device with its center of gravity below its point of suspension, or a fluid medium suspended in a bowl and arranged to control a valving system (electric or otherwise) connected in a circuit with a suitable torque-applying apparatus. The latter comprises one or more torquers coupled to the gyroscope for causing precession of the gyroscope to restore it to vertical position after a departure has been detected by the gravitationally responsive control element.

This type of apparatus, while usable in a wide variety of applications, has the disadvantage that a positional error can be introduced in the gyroscope as a result of lateral accelerations of the craft, as during turns thereof.

One object of the present invention is to provide a gyroscope system arranged to be erected to a reference other than gravity, and thus to be substantially independent of lateral accelerations. In accordance with an important feature of this invention, apparatus is provided for controlling the gyroscope orientation by reference to the polarization of radio waves as they are propagated above and substantially parallel to the earth's surface at low levels. Reliance is placed upon the phenomenon that such radio waves are vertically polarized at great distances from their point of origin, regardless of the polarization of waves as immediately propagated from the transmitting antenna, due to the short-circuiting effect of the earth's surface on horizontal components of the wave energy as it propagates over a considerable distance.

These properties of radio waves are discussed by Dr. F. E. Terman in his text entitled "Radio Engineering," page 598. Further information on this subject is available in the paper by K. A. Norton entitled "Propagation of radio waves over the surface of the earth and in the upper atmosphere," which appeared in the Proceedings of the Institution of Radio Engineers 25, September 9, 1937.

In accordance with my invention, I provide universally suspended apparatus for responding to radio waves and detecting discrepancies between the direction of an axis of the universally suspended apparatus and the direction in space of the electric field polarization vector of the incident radio waves. Motive devices are pro.ided for controlling the suspended apparatus about a plurality of suspension axes, for correcting its position by reference to variation of the received radio signals. Thus, the motive system may be thought of in one sense as apparatus which determines a direction in space characterized according to variations of radio reception. In a preferred embodiment, I employ a gyroscope in the universally suspended apparatus, and torque motors coupled thereto are arranged to cooperate with the gyroscope as the motive means for correcting the space position of the apparatus.

Further objects met by this invention accordingly include the provision of improved apparatus having a radio receiving system for establishing a reference direction according to the character of received radio energy; and the provision of an apparatus system including a gyroscope and a radio reception system for maintaining a predetermined relationship between the gyroscope axis and a predetermined directional characteristic of the radio wave energy reception.

An embodiment of the invention is illustrated in Fig. 1 and in the fragmentary view of Fig. 2. Figs. 3, 4 and 5 are explanatory diagrams referred to in setting forth the operating principles of the instrument.

Referring now to Fig. 1, a gyroscope including a massive rotor and a motor system therefor is incorporated in a rotor shell or casing 26. The casing 26 is universally suspended by a Cardan suspension system, including shafts 27 and 28 journalled in a gimbal ring 29 for freedom about a first transverse axis, the gimbal ring 29 in turn having shafts 30 and 31 journalled in stanchions 32, 32' for freedom about a second transverse axis. The supporting system 27, 28, 29, 30, 31, 32, 32' is arranged in such a way as to have gimbal ring 29 normally rest in a horizontal plane, and to have the axis of the gyro rotor and the case 26 normally vertical.

A first torque motor 33 is provided for exerting torque on the gyroscope rotor and rotor case 26 through shaft 28, relative to gimbal ring 29; and a second torque motor 34 is provided for exerting torque on shaft 30 relative to the adjacent stanchion 32, its torque being transmitted through gimbal ring 29 and shafts 27 and 28 journalled therein to the rotor case 26 and the rotor itself.

It is a well known property of the gyroscope that a torque applied about one transverse axis of a universally suspended gyro is stiffly resisted by the gyroscope system, so that it does not appear to turn to an appreciable extent about the axis of torque application. On the other hand, the gyro does respond by changing its position about another transverse axis substantially perpendicular to the axis of torque application. A clockwise torque applied by torque motor 33, which with the gyro rotor at rest would cause the top of the gyro case 26 to tilt down toward shaft portion 31, does not produce appreciable shift of the gyroscope system in this direction with the rotor operating at its normal speed, but instead, causes a tilt of the gyroscope about the axis of its shafts 30 and 31 journalled in stanchion 32. Assuming that the rotor spin direction is clockwise as viewed from above, the aforementioned clockwise torque applied by unit 33 will cause precession of the gyroscope rotor and rotor case about the axis of shafts 30, 31, causing the top of the gyroscope casing to lean toward torque motor 33.

A counterclockwise torque of torque motor 33 causes the opposite direction of precession about axis 30, 31. Similarly, a clockwise torque application of torque motor 34 is resisted, so that the rotor 58 of this torque motor does not appear to turn, but precession is again produced with the top of the gyroscope case 26 leaning toward torque motor 34, still assuming clockwise rotation of the rotor as viewed from above.

In prior art systems, as described above, gyro motors 33 and 34 normally would be controlled wholly by gravity responsive electric switching means attached to the rotor case 26. In the present invention, however, such gravity control is dispensed with, wholly or at least in part, and a special radio energy responsive system is employed instead.

A motor 43 is arranged on the gyro rotor case 26, to provide rotation of a radio antenna unit which includes a straight shank portion 44 and a section 45 of appreciable length which is disposed at a slight angle to the shank portion 44. The motor 43 is arranged to cause this antenna 44, 45 to revolve about the axis of the shank 44 which axis is aligned with the gyro rotor axis. It will be obvious that the antenna system 44, 45 may be driven by the same motor as is employed within the case 26 for spinning the gyro rotor, as through a suitable speed reduction gear train.

The radio receiver 47 is provided for amplifying and detecting the radio wave energy impinging on the antenna 44, 45, the receiver 47 being coupled to the antenna through a capacitive pickup system cooperating with the shank 44 and a radio transmission line system 46. Coupled to the output of the receiver 47 is a modulator 51 responsive to the detector output, for receiving from a source 48 an alternating input voltage of a frequency ordinarily appreciably higher than the frequency of rotation of the antenna 44, 45 (number of revolutions per second) and for producing an output version of this alternating voltage, amplitude modulated according to variations of amplitude of the energy coming in through antenna 44, 45 and transmission line 46.

This modulated alternating output voltage is conveyed over transmission line 49 to the input circuit of a resolver device or component distributor 50. One suitable form for such a resolver is a rotary transformer of the type having crossed secondary coils. This rotary transformer 50 may be of the quadrature D. C. or A. C. selsyn or Telegon type, or may be a 4-coil resolver unit with one primary winding and both secondary windings employed. It is employed in this apparatus as a distributor of the modulated voltage output of the receiver 47.

The schematic arrangement of the circuits in unit 50 at time $t_1$ (Figs. 3, 4 and 5) is illustrated in Fig. 2. One secondary winding 53 is connected to one of the two polyphase windings 55 of the induction motor 33 employed as the first torquer, and the other secondary winding 54 is connected to one winding 56 of the other torquer 34. The further windings 59 and 60 of torquers 33 and 34 are connected to the alternating voltage source 48 to receive a voltage therefrom which is maintained in phase quadrature with the alternating voltage supplied by the source 48 to the modulator 51.

The operation of this system will now be described in connection with Figs. 3, 4 and 5. In Fig. 3, all of the waveforms are drawn to a common time base, as indicated by the vertical marks passing through parts A—H of this figure. The alternating voltage wave of substantially constant amplitude as supplied by the alternating voltage source 48 to windings 59 and 60 of torque motors 33 and 34 is shown in Fig. 3A, represented as a 60-cycle voltage wave by way of illustration. The alternating voltage supplied by source 48 to the modulator circuit 51 is illustrated in Fig. 3B, as another wave of constant amplitude and of fixed quadrature phase relation to the wave of Fig. 3A.

In Fig. 3C, wave 101 represents the time-variation of output voltage produced by the detector in receiver 47, when the axis of the gyro rotor and the antenna shank 44 are tilted in such a way that the offset section 45 of the antenna travels cyclically through an orbit of varying inclinations, from nearly vertical to a considerable departure from vertical and return. This illustrative inclination of the gyro system is shown in Fig. 4, in the plan and elevation schematic views, and the time designations $t_1$, $t_2$, $t_3$, and $t_4$ represent the positions of the tip of the antenna 44, 45 at these instants corresponding to the similarly designated instants in Fig. 3.

As the antenna proceeds from the point corresponding to the time $t_1$ toward the point corresponding to time $t_2$, the detected signal increases, because the offset portion 45 of the antenna becomes more nearly vertical during this portion of its travel. As it proceeds onward from the position corresponding to time $t_2$, its inclination increases, however, so that the signal strength goes downward until the lowest angle of inclination is reached at time $t_4$, after which the strength again rises as the antenna proceeds through the upward part of its cycle, and it is apparent here that the signal strength with the axis tilted varies between a maximum appreciably above the level 102 and a minimum appreciably below this level, the detector output polarity of course remaining fixed.

The inclination in Fig. 4 is indicated as being an inclination about the journal axis 27, 28 (see Fig. 1). Since no inclination is illustrated here about the other axis 30, 31, it is apparent that a corrective torque is needed only about the axis 30, 31 to provide precession merely about the axis 27, 28 to bring the gyro axis to the desired erect position.

In modulator 51, a voltage component corresponding to the wave of Fig. 3B is amplitude modulated according to the detector output curve 101 of Fig. 3C, producing the output voltage shown in Fig. 3D. This alternating voltage, substantially cophasal with voltage B, rises from its average amplitude value at $t_1$ to a maximum amplitude at $t_2$, thereafter decreasing in amplitude through the average value at time $t_3$ to the minimum amplitude at $t_4$ and again rising through average at $t_5$ to maximum at $t_6$, a complete cycle being shown in the time interval from $t_1$ to $t_5$, the time elapsed during one revolution of the antenna 44, 45.

The waveform shown at D, produced by the modulator 51, is supplied to the input circuit (primary winding) 52 of the resolver 50, which is arranged to have its rotor turned along with the antenna 44, 45. The rotor position as schematically indicated in Fig. 2, showing maximum coupling between primary 52 and secondary 53 and zero coupling between primary 52 and secondary 54, corresponds to the coupling condition prevailing at time $t_1$. With this condition, maximum alternating voltage is being induced in winding 53, and supplied therethrough to winding 55 of torque motor 33. This voltage, indicated at the left-hand end of the graph of Fig. 3F, produces torque therein acting to try to turn the gyro system 26 in the direction of further inclination, but by virtue of the gyro precessional phenomenon, acting momentarily in the manner to result in tilting the antenna 44, 45 toward torque motor 33 if the torque application were sufficiently prolonged.

As the antenna revolves through the period $t_1$ to $t_2$ and the primary 52 of transformer 50 is likewise revolved through a 90° arc, the coupling between windings 52 and 53 is decreased sinusoidally while sinusoidally increasing coupling is provided between primary 52 and secondary winding 54. At $t_2$, when the antenna has travelled upward to its highest position, coupling between winding 52 and winding 53 has diminished to zero, and maximum coupling prevails between primary 52 and secondary 54. These effects are patterned in the curves of Figs. 3F and 3E, respectively, which represent the waves of voltage applied to windings 55 and 56 respectively, through transformer 50.

Now, as the antenna continues onward in the time interval $t_2$—$t_3$, winding 52 recedes from maximum coupling to winding 54, and recommences its coupling to winding 53, but in the opposite phase sense from the coupling to winding 53 prevailing at time $t_1$. At time $t_3$, the primary 52 having revolved 180° from its position shown in Fig. 2, it is again at zero coupling to winding 54 and at maximum coupling to winding 53, in the reverse phase sense as mentioned above. As it proceeds onward, it again commences to be coupled to winding 54, but this time in the phase sense opposite that prevailing during time interval $t_1$—$t_3$.

The wave of Fig. 3E during the time interval $t_1$—$t_3$ produces applicable torque in torque motor 34 in the direction urging antenna 44, 45 toward torque motor 33, but due to the precession phenomenon, this torque acts to overcome the gyro axis tilt indicated in Fig. 4. During the period $t_3$—$t_5$, the alternating voltage supplied to torque motor winding 56 through transformer winding 54 is in the opposite phase sense, tending to cause precession of the gyro even farther from the desired vertical condition, but as is apparent in Fig. 3E, this upset-torque signal is far weaker than the corrective-torque signal of interval $t_1$—$t_3$. Of course, the gyro axis position does not change perceptibly during one cycle of rotation of the antenna 44, 45 and the primary 52 of transformer 50, but there is a net excess of corrective torque over the upset torque as shown in the graph of Fig. 3E, which, over the course of many cycles of rotation of the antenna and transformer primary, is effective to accomplish gradually erection of the gyroscope.

The graph of Fig. 3F shown commencing with appreciable torque in the first mentioned direction shows supply of torque motor 33 during the interval $t_2$—$t_4$ with alternating voltage of the opposite phase producing opposite torque, first rising and then falling to zero at $t_4$, and with another phase reversal at $t_4$ for torque in its original direction during interval $t_4$—$t_6$, etc. As this curve illustrates, however, the torque acting in the first direction is equal to that acting in the opposite direction, and their time intervals are equal so that no net disturbance is produced in the gyroscope as to its position about axis 30, 31.

The reason why the wave of Fig. 3E is so much stronger in time interval $t_1$—$t_3$ than in interval $t_3$—$t_5$ is because the voltage supplied to winding 52 is much greater during interval $t_1$—$t_3$ than in interval $t_3$—$t_5$, the maximum being at $t_2$ and the minimum being at $t_4$, as heretofore explained.

It will be apparent that the wave portions of the graph of Fig. 3F are distorted somewhat by this modulation effect, to the extent that the amplitude of wave of Fig. 3F has an accelerated rise steeply during interval $t_2$—$t_3$ and a decay at a lesser rate during interval $t_3$—$t_4$, and also the modulated wave of the opposite phase or polarity increases gradually during interval $t_4$—$t_5$ and decreases more rapidly during the later part of interval $t_5$—$t_6$. The reason for these shape characteristics in the wave of Fig. 3F is readily seen by reference to the transformer primary input wave of Fig. 3D, in that the transformer input is great at the end of period $t_1$—$t_2$ and at the commencement of the period $t_2$—$t_4$, diminishing all the way to the end of period $t_2$—$t_4$, and conversely, is low in the early part of period $t_4$—$t_6$ and high in the latter part thereof.

As mentioned above, the effect of the appreciable net corrective torque of Fig. 3E is eventually to bring the gyro, through the net clockwise torque application of torque motor 34 and the resultant net gyro precession, to a vertical position in space, as indicated in plan and elevation in Fig. 5. With this erect condition, the detector output is constant as indicated by the line 102, and the waves of voltages applied to windings 56 and 55 of torque motors 34 and 33 are completely symmetrical and balanced, as shown in Fig. 3G and 3H. The input waveform supplied to winding 52 under the erect-axis condition is a wave of constant phase and amplitude, corresponding closely to the wave of Fig. 3B.

The broken line 102 of Fig. 3C represents the average detector output level during tilt, which coincides with the time-graph of detector output when the gyro axis is vertical.

Since many changes could be made in the above construction and many widely different embodiments of this invention could be made without departing from the scope thereof, it is intended that all matter contained in the above description or shown in the accompanying drawings shall be interpreted as illustrative and not in a limiting sense.

What is claimed is:

1. In combination, a member supported for two degrees of freedom, means including a rotating element coupled to and movable with said member, said means producing a uniform or cyclically varying output voltage accordingly as the axis of rotation of said element is aligned in a predetermined direction or is inclined relative thereto, modulator means receiving an alternating input voltage of predetermined frequency and said output voltage and producing a version of said input voltage modulated according to said output voltage, and means responsive to the modulated version of said input voltage and another version thereof for controlling the space orientation of said member, said last-named means including resolving means driven synchronously with the rotation of said rotating element for modulating one of said voltage versions with phase alternations at each 180° rotation of said rotating element.

2. The combination defined in claim 1, wherein said member comprises a gyro, and said means for controlling the orientation thereof includes a torque motor for each axis perpendicular to the orientation correction axes thereof, for producing precession of said gyro.

3. The combination defined in claim 3, wherein each torque motor comprises an alternating current induction motor having first and second windings receiving the two versions of said input voltage including the modulation according to output voltage and the phase-alternating modulation.

4. The combination defined in claim 2, wherein said means including a rotatable element comprises an eccentric radio receiving antenna rotatable about an axis parallel to the axis of said gyro and a radio receiver coupled thereto for amplifying and detecting the energy impinging on said antenna to produce said output voltage.

5. The combination defined in claim 4, wherein said antenna comprises a rod having a section of appreciable length inclined relative to its axis of rotation.

6. In combination, an antenna supported for rotation about a predetermined axis, said antenna being eccentric about said axis, radio receiving means coupled to said antenna for amplifying and detecting directional radial energy received therethrough, means for rotating said antenna, the eccentric movement of the antenna providing a uniform or regularly varying output from said radio receiving means according to the direction of the radio wave energy received, means for producing a wave of a predetermined carrier frequency modulated according to the output of said amplifying and detecting means, means coupled to said antenna rotating means for further modulating said modulated wave cyclically in synchronism with the rotation of said antenna, and means responsive to the output of said further modulating means and said carrier wave for changing the direction of the axis of rotation of said antenna according to variations of said further modulated wave.

7. Apparatus for maintaining a predetermined direction in space according to received radio signals, comprising a body supported for movement about an axis, motive means coupled thereto for moving said body about said axis, an antenna, means for regularly rotating said antenna about an axis of rotation in parallel alignment with a predetermined axis of said body, said antenna being asymmetrical about said axis of rotation, means including a radio receiver coupled to said antenna for amplifying and detecting signals received therethrough and for producing an output voltage varying according to variation of signal strength supplied thereto through said antenna, means for supplying alternating voltage, means responsive to said amplifying and detecting means for modulating said alternating voltage according to variations of said detector output, rotary resolver means coupled to said antenna to be rotated in synchronism therewith, means for supplying the output of said modulating means to an input circuit of said rotary resolver, and means coupled to an output circuit of said rotary resolver means and to said alternating voltage supplying means for controlling said motive means.

8. Vertical reference apparatus comprising a universally suspended body, radio receiving means including amplifier and detector stages, means on said body including an antenna electrically coupled to said radio receiving means for supplying to said radio receiving means signals varying according to the inclination in any azimuthal direction of a predetermined axis of said body relative to the substantially vertical polarization of radio wave energy arriving thereat from remote radio stations, and motive means responsive to the output of said radio receiving means for regulating the position of said body about two perpendicular axes to retain said predetermined axis thereof in alignment with the polarization of said wave energy and thereby retain said predetermined axis substantially vertical.

9. Apparatus for positioning a movable body with a predetermined axis thereof vertical, comprising an antenna system on said body for intercepting radio wave energy, radio amplifying and detecting means coupled to said antenna system for producing output signals varying according to variations of the energy intercepted by said antenna system, means including antenna system for producing variation of the energy interception of sensing and magnitude according to direction and extent of tilt of said predetermined axis of said movable body with respect to the electric vector direction of the incident radio wave energy, and means responsive to the output of said radio amplifying and detecting means for exerting position-corrective forces on said movable body about mutually transverse axes to align said predetermined axis thereof with the electric vector direction of said incident energy, said electric vector direction being transverse the direction of arrival of said energy and being substantially vertical at an appreciable distance from the source of radiation.

10. Apparatus for positioning a movable body with a predetermined axis thereof vertical, comprising an antenna system on said body for intercepting radio wave energy, radio amplifying and detecting means coupled to said antenna system for producing output signals varying according to variations of the energy intercepted by said antenna system, means including said antenna system for producing variation of the energy interception according to tilt of said predetermined axis of said movable body with respect to the electric vector direction of the incident radio wave energy, the energy interception being uniform for all azimuthal directions of energy arrival, and means responsive to the output of said radio amplifying and detecting means for exerting position-corrective forces on said movable body about mutually transverse axes to align said predetermined axis thereof with the electric vector direction of said incident energy, said electric vector direction being substantially vertical at an appreciable distance from the source of radiation.

11. Apparatus for positioning a movable body with a predetermined axis thereof vertical, comprising an antenna on said body for intercepting radio wave energy, means for regularly rotating said antenna about an axis parallel to said predetermined axis, at least an appreciable portion of said antenn being inclined at an acute angle to said axis of rotation, radio amplifying and detecting means coupled to said antenna to accept energy intercepted thereby, said radio amplifying and detecting means cooperating with said antenna to produce an output voltage varying cyclically with tilt of said predetermined axis with respect to the electric vector of the incident radio energy, said antenna having a substantially uniform azimuthal response pattern, and means responsive to the output of said radio amplifying and detecting means for exerting position-corrective forces on said movable body to align said predetermined axis thereof with the electric vector direction of said incident energy, said electric vector direction being substantially vertical at an appreciable distance from the source of radiation.

ROBERT F. ROTHSCHILD.

References Cited in the file of this patent

UNITED STATES PATENTS

| Number | Name | Date |
|---|---|---|
| 2,165,800 | Koch | July 11, 1939 |
| 2,362,832 | Land | Nov. 14, 1944 |
| 2,412,612 | Godet et al. | Dec. 17, 1946 |
| 2,437,251 | Frische | Mar. 9, 1948 |
| 2,446,024 | Porter et al. | July 27, 1948 |
| 2,484,819 | Ferrill | Oct. 18, 1949 |
| 2,511,614 | Agins et al. | June 13, 1950 |
| 2,517,612 | Varian | Aug. 8, 1950 |
| 2,555,209 | Vacquier et al. | May 29, 1951 |

FOREIGN PATENTS

| Number | Country | Date |
|---|---|---|
| 33,746 | Netherlands | Sept. 16, 1934 |